United States Patent [19]

Ueki

[11] Patent Number: 4,806,830
[45] Date of Patent: Feb. 21, 1989

[54] DEVICE AND PROCESS FOR LIGHTING A FLUORESCENT DISCHARGE LAMP

[75] Inventor: Tadao Ueki, Kanagawa, Japan

[73] Assignee: Kabushiki Kaisha Denkosha, Tokyo, Japan

[21] Appl. No.: 883,972

[22] Filed: Jul. 10, 1986

[30] Foreign Application Priority Data

Oct. 29, 1985 [JP] Japan ............................ 60-240493

[51] Int. Cl.$^4$ .......................................... H05B 41/232
[52] U.S. Cl. ................................ 315/244; 315/205; 315/206; 315/209 R; 315/276; 315/242; 315/247; 315/DIG. 2; 315/DIG. 5
[58] Field of Search .................. 315/DIG. 7, DIG. 5, 315/244, 242, 232, 283, 206, 247, 205, 209 R, DIG. 2, 276

[56] References Cited

U.S. PATENT DOCUMENTS

| | | | |
|---|---|---|---|
| 2,923,856 | 2/1960 | Greene et al. | 315/DIG. 7 X |
| 3,247,422 | 4/1966 | Shultz | 315/206 |
| 3,412,287 | 11/1968 | Hehenkamp | 315/DIG. 7 X |
| 3,573,544 | 4/1971 | Zonis et al. | 315/206 |
| 3,743,918 | 7/1973 | Maitre | 315/DIG. 7 X |
| 4,318,170 | 3/1982 | Cabalfin | 315/DIG. 7 X |
| 4,463,286 | 7/1984 | Justice | 315/244 |
| 4,532,456 | 7/1985 | Knoll et al. | 315/244 |
| 4,608,523 | 8/1986 | Nilssen | 315/244 |
| 4,641,061 | 2/1987 | Munson | 315/244 |

FOREIGN PATENT DOCUMENTS 57-141895 9/1982 Japan .................................. 315/244

Primary Examiner—Leo H. Boudreau
Assistant Examiner—Mark R. Powell
Attorney, Agent, or Firm—Gordon W. Hueschen

[57] ABSTRACT

There is disclosed a device and process for starting up a fluorescent discharge lamp in which a high-frequency pulse is generated having narrow voltage peaks above the voltage required to start electric discharge and broad valleys, applied to the elements of the lamp to effect start up of fluorescence and, after start-up, the voltage automatically goes back to maintenance voltage having broad peaks at the maintenance voltage and relatively narrow valleys. The automatic cutback is effected by the load introduced by the electric discharge and the feedback from the emitter of the transistor used to generate the pulse. A capacitor is serially-connected in the lamp circuit to inhibit the flow of DC current therein.

18 Claims, 3 Drawing Sheets

4,806,830

DEVICE AND PROCESS FOR LIGHTING A FLUORESCENT DISCHARGE LAMP

BACKGROUND OF THE INVENTION

1. Field of the Invention

This invention relates to a device and process for lighting a fluorescent discharge lamp, and more particularly it relates to a device and process for lighting a fluorescent discharge lamp which lights a fluorescent discharge lamp with a high-frequency pulse voltage generated by a circuit using substantially no stabilizing loads.

2. Prior Art

Generally, a fluorescent discharge lamp, in starting electric discharge from the cold cathode thereof, inherently requires a voltage roughly several times the terminal voltage used during the period of sustained discharge to be applied between the terminals of the cold cathode. For this purpose, the fluorescent discharge lamp is provided at the opposite terminals thereof with filaments which, on being heated, emit thermoelectrons and start electric discharge with a relatively low voltage. During the period of sustained electric discharge, if an increase occurs in the supplied current, the fluorescent discharge lamp retains the so-called negative characteristic, i.e., the nature that the voltage between the terminals shows a value approximating a fixed level. To ensure stable lighting of the fluorescent discharge lamp, therefore, the fluorescent discharge lamp requires a lighting device which is capable, at the time of starting electric discharge, of allowing a voltage exceeding the voltage used by the fluorescent discharge lamp for sustained electric discharge to be applied between the opposite electrodes of the fluorescent discharge lamp and, after the lamp has been lit up, regulating the electric current flowing to the fluorescent discharge lamp and, at the same time, stabilizing the incoming electric current of the fluorescent discharge lamp enough to withstand a possible variation in the voltage of the power source by virtue of a load (such as inductance, capacitance, or resistance) connected serially to the fluorescent discharge lamp, and enabling the fluorescent discharge lamp to be lit up in a stable state at all times.

The lighting devices for fluorescent discharge lamps currently in most popular use preponderantly utilize power sources of commercial frequency directly. With the voltage of common use (100 V or 200 V), they cannot cause their cold cathodes to start electric discharge. They, therefore rely on a glow lamp to heat the filaments of the fluorescent discharge lamp temporarily in order to effect emission of thermoelectrons, lower the voltage for starting electric discharge, and induce electric discharge. After the electric discharge is started, they rely on a load connected serially thereto to regulate the electric current used for the electric discharge.

The lighting device for the fluorescent discharge lamp of the nature described above, however, has the disadvantage that much time is spent in inducing the electric discharge and the volume, weight, and power loss of the inductance used for regulating the electric current for the electric discharge are large.

Recently, lighting devices for fluorescent discharge lamps which use semiconductors for the purpose of precluding the disadvantage of the conventional lighting devices have been finding actual adoption.

A typical example of these lighting devices of fluorescent discharge lamps is illustrated in FIG. 3 and is constructed as described below.

To an AC power source, a capacitor 102 and a capacitor 103 are parallely-connected through the medium of a fuse 101 and the AC input terminal of a full-wave rectifier 106 is also connected through the medium of an inductance 104 which is serially-connected to the fuse 101. To a plus terminal of the full-wave rectifier 106 is connected a resistor 105. Through the medium of the resistor 105, serially-connected circuits of a capacitor 107, a resistor 108, a resistor 109, and a diode 110 are connected to a minus terminal of the full-wave rectifier 106. A capacitor 111 is connected between the junction point between the resistor 108 and the resistor 109 and one terminal of the full-wave rectifier 106. The base of a transistor 114 is connected to the junction point through the medium of a parallely-connected circuit of a resistor 112 and an inductance 113.

Further, interposed between the collector terminal of the transistor 114 and resistor 105 is connected a parallel circuit comprising a capacitor 120 and an inductance 118. The emitter terminal of the transistor 114 is connected, through the medium of a diode 115, to a transformer winding 117 which is connected to one terminal of the full-wave rectifier 106. The collector and the emitter of the transistor 114 are interconnected with a diode 116. To the collector terminal of the transistor 114 is connected a transformer winding 119. Transformer winding 119 is connected through transformer winding 124 to an element of one filament 126 of a fluorescent lamp 127. The like element of the other filament 126 is connected to the resistor 105. The other elements of the two filaments 126 are connected serially in a curcuit comprising a trigger diode 121, a diode 122, a diode 123, and transformer winding 125.

The lighting device of a fluorescent discharge lamp which is constructed as described above is operated as follows:

First, when an AC voltage is applied to the full-wave rectifier 106, the full-wave rectifier 106 and the smoothing capacitor 107 cooperate to generate a sparingly-pulsating DC voltage.

Then, when this voltage is applied on the base of the oscillating transistor 114, an oscillating circuit composed of the inductance 118 and the capacitor 120 generates a high-frequency voltage of the order of 40 KHz closely approximating a sine wave, based on the circuit constant of the oscillating circuit.

This high-frequency voltage is boosted by the winding 119. Then, by feeding to the winding 125 a pulse voltage generated by the breakover voltage of the trigger diode 121 and, at the same time, boosting the pulse voltage with the winding 124 thereby generating a high-voltage pulse, the fluorescent discharge lamp 127 is lit up. To be specific, the filament 126 when heated emits thermoelectrons until pulses of high voltage are applied on the fluorescent discharge lamp 127 by the breakover voltage of the trigger diode 121. Thereafter the pulses of high voltage subsequently generated light up the fluorescent discharge lamp 127.

After the fluorescent discharge lamp 127 has been lit up, the high-frequency voltage which has been boosted by the winding 119 is applied on the fluorescent discharge lamp 127 and, at the same time, the electric current for the electric discharge is regulated by the winding 124 to maintain the electric discharge of the fluorescent discharge lamp 127.

In the conventional lighting device for the fluorescent discharge lamp constructed as described above, the voltage applied between the filaments 126 cannot be increased so much as to exceed the voltage for starting electric discharge of the fluorescent discharge lamp 127, even though the feedback current flowing to the transformer winding 117 may be increased. In other words, when an AC power source of 100 V is used as the power source for the lighting device of the fluorescent discharge lamp to cause oscillation of a sine wave, the oscillating voltage generated in an oscillating circuit composed of the capacitor 120 and the inductance 118 connected to the collector side of the transistor 114 is about 140 to 150 V at most. For the fluorescent discharge lamp 127 to be lit up under this condition, therefore, it requires use of a part which is capable of boosting this voltage.

The magnitude of the electric current flowing to the transformer winding 124 and the like are variable with the capacity and the type of the fluorescent discharge lamp 127. The capacity and the type of the fluorescent discharge lamp 127 which can be connected to the circuit are fixed by the capacities of the parts connected to the circuits serving to feed power to the fluorescent discharge lamp 127. When the fluorescent discharge lamp to be lit up happens to have a large capacity, the lighting device itself is required to have a large capacity, the lighting device itself is required to be proportionally large. The conventional lighting device for the fluorescent discharge lamp is such that it must be of a particular grade, exactly suiting the capacity and the type of the fluorescent discharge lamp 127 to which the lighting device is connected.

This invention has been produced for the purpose of overcoming the problem suffered by the conventional lighting device. It aims to provide a device and process for lighting a fluorescent discharge lamp, which has no need for any part serving to boost voltage, makes possible the desired light-up of a fluorescent discharge lamp without reference to the capacity and the type of the fluorescent discharge lamp to which the device is connected or the process used, and admits of interchangeability with all types of fluorescent discharge lamps.

SUMMARY OF THE INVENTION

The invention relates to a device for lighting a fluorescent discharge lamp which lamp requires a relatively high, exciting voltage to initiate fluorescence and a relativley low, maintenance voltage to maintain fluorescence which device comprises:

a generating means for generating a high-frequency pulse having relatively sharp peaks which reach a voltage above the exciting voltage;

said generating means comprising a transistor-activated resonating circuit;

circuitry for applying said pulse to the terminals of said fluorescent discharge lamp comprising a serially-connected capacitor to prevent flow of direct current into said lamp; and a voltage-reducing means for reducing the voltage of the peaks of said pulse to said maintenance voltage once the lamp has been lit.

The invention comprises one or more further features in which the voltage-reducing means comprises a feedback circuit comprising a feedback-signaling coil is serially-connected with the emitter of the transistor through diode means oriented to prevent feedback through said emitter and magnetically-coupled with the said resonating circuit; in which the initializing pulse comprises narrow peaks and broad valleys; in which the maintenance pulse comprises broad peaks and relatively narrow valleys; in which the initializing pulse has a waveform substantially as shown in FIG. 2(A); and in which the maintenance pulse has a waveform substantially as shown in FIGS. 2(B) and 2(C).

DESCRIPTION OF THE PREFERRED EMBODIMENTS

Now, an embodiment of the present invention will be described in detail below with reference to the accompanying drawings.

Figure 1:
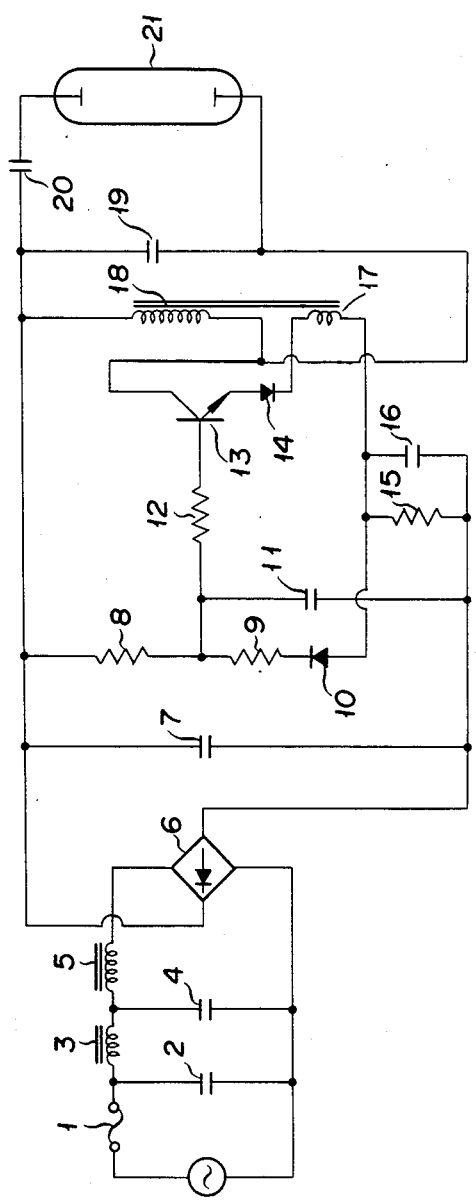
FIG. 1 is a circuit diagram of a lighting device for a fluorescent discharge lamp according to the present invention.

FIG. 1 is a circuit diagram of a lighting device for a fluorescent discharge lamp according to this invention. The circuit shown in the diagram is broadly divided into a power source circuit and an oscillating circuit and 2, 3, 4, and 5 collectively stand for a noise filter, 6 for a full-wave rectifier, 7 for a smoothing capacitor, 13 for an oscillating transistor, 16 for a feedback signal feeding capacitor, 17 for a feedback signaling coil, 18 for an oscillating coil, 19 for a resonating capacitor, 20 for a DC inhibiting capacitor, and 21 for a fluorescent discharge lamp.

The power source circuit is composed of a filter comprising a capacitor 2 and a coil 3 and a filter comprising a capacitor 4 and a coil 5, possessing two different frequency bands determined by the inductances of the coils 3 and 5 and the capacitances of the capacitors 2 and 4. This power circuit is connected to an AC power source through the medium of a fuse 1, a full-wave rectifier 6 connected through the medium of these noise-reduction filters, and a smoothing capacitor 7 parallely-connected to the output terminals of the full-wave rectifier 6.

The oscillating circuit is composed of a control circuit which is formed by connecting a base voltage-feeding resistor 8 and a feedback signal-feeding coupling capacitor 11 to a base current-controlling resistor 12 of a closed circuit comprising the base current-controlling resistor 12 connected to the base of an oscillating transistor 13, a feedback voltage-inhibiting diode 14 connected to the emitter of the oscillating transistor 13, feedback-signaling coil 17, a feedback voltage-inhibiting diode 10, and a base current adjusting resistor 9 and connecting a parallel circuit of a self-bias resistor 15 and a feedback signal-feeding capacitor 16 to the feedback voltage-inhibiting diode 10 and a resonant circuit which is formed of an oscillating coil 18 connected to a collector of the oscillating transistor 13 and the full-wave rectifier 6 and a resonating capacitor 19.

A fluorescent discharge lamp 21 which constitutes a load is parallely-connected to the oscillating circuit through a serially-connected capacitor 20.

Figure 2:
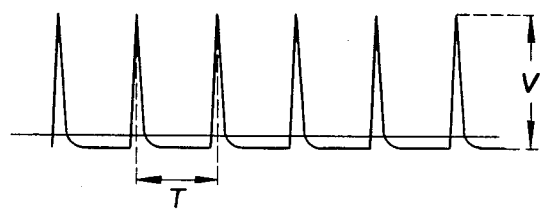
FIGS. 2(A) through 2(F) inclusive illustrate waveform diagrams used for the explanation of the operation of the device of FIG. 1.
Figure 2:
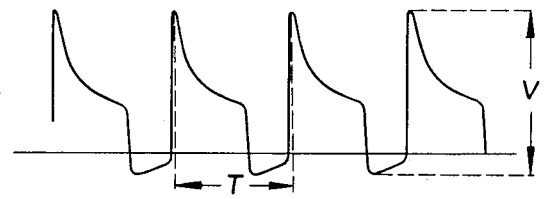
Figure 2:
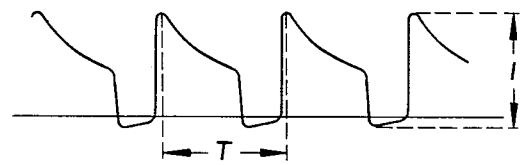
Figure 2:
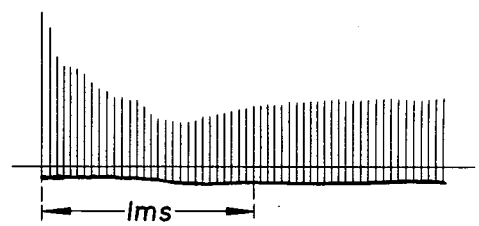
Figure 2:
Figure 2:
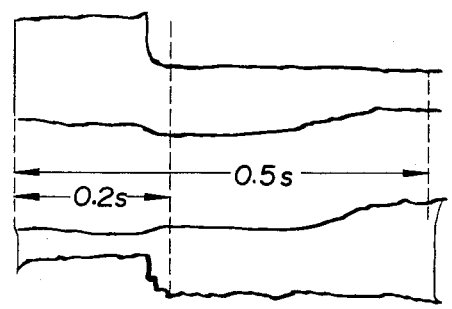
Figure 3:
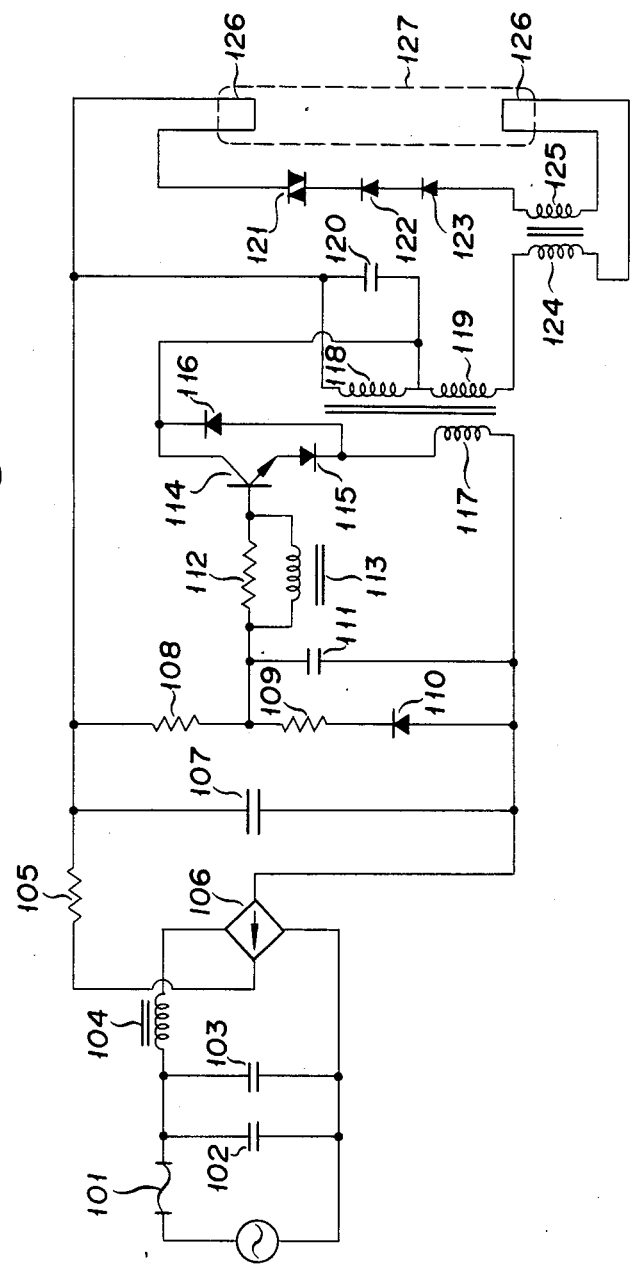
FIG. 3 is a circuit diagram of a conventional lighting device for a fluorescent discharge lamp.

The circuit constants of the various elements forming the circuits described above are set as follows:

2: Capacitor, 0.22 μF
3: Coil, 40 μH
4: Capacitor, 1,000 pF
5: Coil, 40 μH
7: Smoothing capacitor, 100 μF
8: Base voltage-feeding resistor, 80 kΩ
9: Base current-feeding resistor, 500 Ω (variable)
11: Feedback-feeding coupling capacitor, 0.47 μF
12: Base current-controlling resistor, 100 Ω
15: Self-bias resistor, 5 Ω
16: Bias voltage-smoothing and feedback signal-feeding capacitor, 0.47 μF
19: Resonating capacitor, 750 pF
20: DC cutting capacitor, 0.22 μF Now, the discharge lamp lighting circuit constructed as described above will be described below with reference to the waveform diagram shown in FIG. 2.

First, when an AC voltage is applied on this circuit, this AC voltage is rectified by the full-wave rectifying circuit 6 and, at the same time, converted by the smoothing capacitor 7 into a DC voltage of a small ripple factor. This DC voltage is applied on the base of the oscillating transistor 13 through the medium of the base voltage-feeding resistor 8 and the base current-adjusting resistor 12. As the result, the state of continuity is established between the base and the emitter of the oscillating transistor 13 and an induced voltage is generated in the feedback-signaling coil 27 magnetically-connected to the oscillating coil 18 by the electric current which has flowed into the resonant circuit composed of the oscillating coil 18 and the resonating capacitor 19, both connected to the collector of the oscillating transistor 13.

When the induced voltage is fed back to the base of the oscillating transistor 13 through the medium of the capacitor 16 and the capacitor 11, the oscillating circuit mentioned above produces a sustained oscillating at an oscillation frequency fixed by the element constants of the oscillating coil 18 and the resonating capacitor 19, as shown by the waveform diagram of FIG. 2(A). It is characterized by narrow, sharp peaks and broad valleys.

The oscillating cycle T of the pulse waveform shown in the diagram is about 40 μS and the peak value of this waveform is about 1,500 V. When an AC voltage is applied on this circuit while the fluorescent discharge lamp 21 is in connection with the circuit, a voltage of the form of an intermittent pulse shown in the diagram is applied on the fluorescent discharge lamp 21. Since the peak value possessed by this waveform is higher than the voltage the fluorescent discharge lamp 21 requires for starting electric discharge, the fluorescent discharge lamp 21 begins electric discharge.

Then, when the fluorescent discharge lamp 21 assumes the state of sustained electric discharge, it acts as a load in the circuit, and the interterminal voltage of the fluorescent discharge lamp 21 falls to a maintenance voltage and the oscillating voltage generated by the oscillating circuit assumes a rectangular voltage waveform closely approximating the maintenance voltage in magnitude. As the result, the voltage generated in the feedback-signaling coil 17 is affected by a voltage waveform variation produced in the oscillating coil 18 and the magnitude of voltage fed back to the base of the oscillating transistor 13 is regulated.

The waveforms of the interterminal voltage and current of the fluorescent discharge lamp 21 in the aforementioned stage of sustained electric discharge are shown in FIGS. 2(B) and 2(C). The cycle T of the voltage waveform shown in FIG. 2(B) is about 60 μS and the peak value thereof is about 400 V. In the case of the current waveform shown in FIG. 2(C), the cycle T is about 60 μS and the peak value is about 1 A.

The waveforms representing lapse state in the interterminal voltage and current of the fluorescent discharge lamp 21 after application of the AC voltage on the circuit are shown in FIGS. 2(D) and 2(E). A review of these waveforms reveals that the peak value of the pulse voltage applied on the terminals of the fluorescent discharge lamp 21 reaches the highest level (about 1,700 V) during the initial state of the operation, gradually decreases until about 0.5 mS after termination of the initial stage of the operation, and substantially levels off after elapse of about 1 mS. Similarly, the peak value of the electric current flowing into the fluorescent discharge lamp 21 gradually increases until 0.5 mS after termination of the initial stage of the operation of the circuit and substantially levels off after lapse of about 0.5 mS.

The time-course change of the interterminal voltage and current of the fluorescent discharge lamp 21 after termination of the initial stage of the operation of the circuit is shown in FIG. 2(F). Up to this point there is no load in the circuit. Once the discharge starts, however, the fluorescent discharge lamp 21 becomes a load in the circuit so that the voltage is automatically reduced. The waveform of the no-load circuit is shown in FIG. 2(A) and the corresponding waveform for the loaded circuit is shown in FIG. 2(B).

From this diagram, it is noted that the peak value of voltage falls near 0.15 S and that of current rises near 0.15 S. At the time that the peak values of voltage and current suddenly change, the fluorescent discharge lamp 21 starts electric discharge and assumes luminosity.

Since the circuit is configurated so that the electric current feedback to the base of the oscillating transistor 13 is allowed to acquire an ample magnitude, as described above, it oscillates a voltage in the form of an intermittent sharp pulse before start of electric discharge and voltage of a rectangular pulse form after start of electric discharge. The magnitude of the feedback to the base of the oscillating transistor 13, depending on the capacity and the load (fluorescent discharge lamp), is controlled by the action of the feedback signaling coil 17 keeping a union with the oscillating coil 18 in such a manner as to maintain the load under the optimum condition. Thus, one and the same lighting circuit can be used for annular fluorescent discharge lamps 20 to 40 W in power, for linear fluorescent discharge lamps 20 to 80 W in power, and various slimline lamps. Further, in the case of small fluorescent discharge lamps, one and the same lighting circuit can be used for a total power capacity of up to about 80 W, such as, for example, three fluorescent discharge lamps each 20 W in power, or one fluorescent discharge lamp 20 W in power plus one fluorescent discharge lamp 40 W in power.

The base current controlling resistor 12 determines the luminosity of the fluorescent discharge lamp 21. Thus, the luminosity can be increased or decreased by varying this value of this resistor. It is of advantage sometimes, therefore, to use a variable resistor, but it is to be understood that, at other times, it is desirable that it be a fixed resistor.

Further, since the fluorescent discharge lamp 21 connects serially to the DC inhibiting capacitor 20, the electric current for electric discharge flowing to the fluorescent discharge lamp 21 contains no DC component and the possible occurrence of a black spot due to polarization can be precluded. Since the lighting device relies on a cold cathode to start electric discharge, it suffices to use only two wires for connection to the fluorescent discharge lamp.

It is clear from the description given above that the lighting device for the fluorescent discharge lamp of this invention has no need for any special circuit for starting electric discharge or for a load adapted to restrict the electric current during electric discharge and, therefore, the number of parts used in the device is small and the device itself is small and light and the production cost of the device is low. Further, since the lighting device can start electric discharge in the state of a cold cathode, the number of wires required to be connected to the fluorescent discharge lamp is only two. This invention also has an effect of enabling one and the same lighting device to light various types of fluorescent discharge lamps.

It is to be understood that the invention is not to be limited to the exact details of construction, operation, or exact materials or embodiments shown and described, as various modifications and equivalents will be apparent to one skilled in the art, and the invention is therefore to be limited only by the full scope of the appended claims.

I claim:

1. A device for lighting a fluorescent discharge lamp which lamp requires a relatively high exciting voltage to initiate fluorescence and a relatively low maintenance voltage to maintain fluorescence, which device comprises:

a generating means comprising a resonating circuit including a transistor for generating a high-frequency initializing pulse having relativley sharp peaks which reach a voltage above the exciting voltage when current through the transistor decays;

circuitry for applying said initializing pulse to the terminals of said fluorescent discharge lamp; and a voltage-reducing means for reducing the voltage of the peaks of said initializing pulse to a maintenance pulse at said maintenance voltage once the lamp has been lit;

said resonating circuit comprising transformer means including a resonating coil as the sole primary winding thereon having a capacitor connected in parallel therewith, the collector of said transistor being connected to one end of said resonating coil and the base thereof being connected to the other end of said resonating coil, and with a resistance connected in series between said base and said coil;

said generating means and said voltage-reducing means comprising a feedback-signaling coil mounted on said transformer means as the sole secondary winding thereon and magnetically coupled with said resonating coil and connected with the emitter of said transistor through anti-feedback means and to the base of said transistor through serially connected capacitors;

said circuitry for applying said initializing pulse and said maintenance voltage to said flourescent discharge lamp comprising solely two terminals, said terminals being adapted to be connected to the lamp terminals one at each end of said lamp, one of the terminals of said circuitry being connected to one end of said resonating coil and having a capacitor connected in series therebetween to prevent flow of direct current into said lamp, and the other terminal of said circuitry being connected to the other end of said resonating coil;

said device being activated by a power source having one output terminal connected to one end of said resonating coil and the other output terminal connected between said serially connected capacitors, and through a serially connected resistor to one end of said feedback signalling coil.

2. A device of claim 1 in which the initializing pulse comprises a waveform having relatively narrow sharp peaks of high amplitude alternating with relatively broad valleys of low amplitude.

3. A device of claim 1 in which the maintenance pulse comprises a waveform having relatively broad peaks of high amplitude alternating with relatively narrow valleys of low amplitude.

4. A device of claim 2 in which the maintenance pulse comprises a waveform having relatively broad peaks of high amplitude alternating with relatively narrow valleys of low amplitude.

5. A device of claim 2 in which the initializing pulse has a waveform substantially as shown in FIG. 2(A).

6. A device of claim 3 in which the maintenance pulse has a waveform substantially as shown in FIGS. 2(B) and 2(C).

7. A device of claim 6 in which the maintenance pulse has a waveform substantially as shown in FIGS. 2(B) and 2(C).

8. A process for lighting a fluorescent discharge lamp which lamp requires a relatively high exciting voltage to initiate fluorescence and a relatively low maintainance voltage to maintain fluorescence, which process comprises:

generating by means comprising a resonating circuit including a transistor a high-frequency initializing pulse having relatively sharp peaks which reach a voltage above the exciting voltage when current through the transistor decays;

applying said initiallizing pulse to the terminals of said fluorescent discharge lamp; and reducing the voltage of the peaks of said initializing pulse to a maintenance pulse at said maintenance voltage once the lamp has been lit;

said resonating circuit comprising transformer means including a resonating coil as the sole primary winding thereon having a capacitor connected in parallel therewith, the collector of said transistor being connected to one end of said resonating coil, and the base thereof being connected to the other end of said resonating coil, and with resistance connected in series between said base and said coil;

the voltage generation and the voltage reduction being effected by a feedback-signaling coil mounted on said transformer means as the sole secondary winding thereon and magnetically coupled with said resonating coil and coupled with the emitter of said transistor through anti-feedback means and connected to the base of said transistor through serially connected capacitors;

said circuitry for applying said initiallizing pulse and said maintenance voltage to said fluorescent discharge lamp comprising solely two terminals, said terminals being adapted to be connected to the lamp terminals one at each end of said lamp, one of the terminals of said circuitry being connected to one end of said resonating coil and having a capacitor connected in series therebetween to prevent flow of direct current into said lamp, and the other terminal of said circuitry being connected to the other end of said resonating coil;

said device being activated and maintained by a power source having one output terminal connected to one end of said resonating coil and the other output terminal connected between said serially connected capacitors, and through a serially connected resistor to one end of said feedback-signalling coil.

9. A process of claim 8 in which the initializing pulse comprises a waveform having relatively narrow sharp peaks of high amplitude alternating with relatively broad valleys of low amplitude.

10. A process of claim 8 in which the maintenance pulse comprises a waveform having relatively broad peaks of high amplitude alternating with relatively narrow valleys of low amplitude.

11. A process of claim 9 in which the maintenance pulse comprises a waveform having relatively broad peaks of high amplitude alternating with relatively narrow valleys of low amplitude.

12. A process of claim 9 in which the initializing pulse has a waveform substantially as shown in FIG. 2(A).

13. A process of claim 10 in which the maintenance pulse has a waveform substantially as shown in FIGS. 2(B) and 2(C).

14. A process of claim 12 in which the maintenance pulse has a waveform substantially as shown in FIGS. 2(B) and 2(C).

15. A device of claim 4 in which the voltage-reducing means also causes a change in the frequency of the pulses such that the time intervals T of the waveform of the maintenance pulse are longer than those of the initializing pulse.

16. A device of claim 3 in which said broad peaks are approximately twice as wide as said narrow valleys.

17. A device of claim 4 in which said broad peaks are approximately twice as wide as said narrow valleys.

18. A process of claim 9 in which said broad valleys having substantially flat bottoms and substantially zero amplitudes and said narrow sharp peaks extend sharply upward from adjacent the front edges of said flat bottoms to the initializing voltage.

* * * * *

UNITED STATES PATENT AND TRADEMARK OFFICE
CERTIFICATE OF CORRECTION

PATENT NO. : 4,806,830
DATED : February 21, 1989
INVENTOR(S) : Tadao Ueki

It is certified that error appears in the above-identified patent and that said Letters Patent is hereby corrected as shown below:

Col. 2, line 37; "curcuit" should read -- circuit --
Col. 5, line 28; "27" should read -- 17 --
Col. 7, line 55; delete "a"
Col. 7, line 66; "flourescent" should read -- fluorescent --

Signed and Sealed this

Nineteenth Day of September, 1989

Attest:

DONALD J. QUIGG

Attesting Officer

Commissioner of Patents and Trademarks